United States Patent
Oppolzer

(10) Patent No.: US 10,761,529 B2
(45) Date of Patent: Sep. 1, 2020

(54) TRAJECTORY-BASED GUIDANCE OF A MOTOR VEHICLE

(71) Applicant: Robert Bosch GmbH, Stuttgart (DE)

(72) Inventor: Lukas Oppolzer, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/006,302

(22) Filed: Jun. 12, 2018

(65) Prior Publication Data

US 2018/0364710 A1    Dec. 20, 2018

(30) Foreign Application Priority Data

Jun. 19, 2017 (DE) .................... 10 2017 210 173

(51) Int. Cl.
*G05D 1/00* (2006.01)
*G05D 1/02* (2020.01)

(52) U.S. Cl.
CPC ......... *G05D 1/0061* (2013.01); *G05D 1/0055* (2013.01); *G05D 1/0088* (2013.01); *G05D 1/0212* (2013.01); *G05D 1/0214* (2013.01); *G05D 1/0274* (2013.01); *G05D 2201/0213* (2013.01)

(58) Field of Classification Search
CPC . B60W 30/06; B62D 15/0285; G05D 1/0285; G05D 2201/0213; G08G 1/14; G08G 1/144; G08G 1/168
See application file for complete search history.

(56) References Cited

U.S. PATENT DOCUMENTS

| | | | |
|---|---|---|---|
| 10,040,450 B1* | 8/2018 | Pal | G05D 1/0088 |
| 2017/0057510 A1* | 3/2017 | Herbach | B62D 15/0265 |
| 2017/0120803 A1* | 5/2017 | Kentley | B60Q 1/26 |
| 2018/0265130 A1* | 9/2018 | Derendarz | B62D 15/0285 |
| 2018/0281859 A1* | 10/2018 | Derendarz | B62D 15/0285 |
| 2018/0362013 A1* | 12/2018 | Ungermann | B60T 7/14 |

FOREIGN PATENT DOCUMENTS

| | | |
|---|---|---|
| DE | 102014200611 A1 | 7/2015 |
| DE | 102015205142 A1 | 9/2016 |
| WO | 2017041927 A1 | 3/2017 |

* cited by examiner

*Primary Examiner* — Rachid Bendidi
(74) *Attorney, Agent, or Firm* — Norton Rose Fulbright US LLP; Gerard Messina

(57) ABSTRACT

A method for controlling a motor vehicle includes detecting a first predefined trajectory, determining a region across which the first trajectory leads, determining a second trajectory that has a different extension in the determined region than the first trajectory, detecting a driver-controlled selection of one of the trajectories, and autonomously controlling the motor vehicle in such a way that it follows the selected trajectory.

10 Claims, 3 Drawing Sheets

TRAJECTORY-BASED GUIDANCE OF A MOTOR VEHICLE

CROSS-REFERENCE TO RELATED APPLICATIONS

The present application claims priority under 35 U.S.C. § 119 to DE 10 2017 210 173.3, filed in the Federal Republic of Germany on Jun. 19, 2017, the content of which is hereby incorporated by reference herein in its entirety.

FIELD OF THE INVENTION

The present invention relates to the driver-independent guidance of a motor vehicle. More specifically, the present invention relates to the guidance of the motor vehicle along a predefined trajectory.

BACKGROUND

A motor vehicle includes a driver-assistance function which is meant to make the guidance of the motor vehicle less stressful for the driver. For example, the motor vehicle can be guided along a predefined trajectory in an either partially or completely automated manner for the purpose of carrying out a parking or unparking operation.

DE 10 2015 205 142 A1 relates to a method for the driver-controlled teaching of a trajectory in order to later automatically guide a motor vehicle along the trajectory.

Prior to guiding the motor vehicle along the trajectory, the trajectory can be presented to a person who then decides whether or not the trajectory is to be used for a partially or fully automatic control. For example, if the person deems a safety distance from an object along the trajectory to be insufficient, then the trajectory might not be used. As a rule, the trajectory is graphically displayed to the person from a bird's eye view. This may be perceived as confusing, and a safety distance to an object that is at a vertical offset from the motor vehicle may be difficult to judge.

SUMMARY

One objective on which the present invention is based is to provide an improved technique by which a trajectory for the subsequent driver-independent guidance of the motor vehicle is able to be presented in a more optimal manner.

A method for controlling a motor vehicle includes steps of detecting a first predefined trajectory; determining a region across which the first trajectory leads; determining a second trajectory that has a different extension than the first trajectory in the determined region; detecting a driver-controlled selection of one of the trajectories; and autonomously guiding the motor vehicle in such a way that it follows the selected trajectory.

The method makes it possible to travel the selected trajectory so that a driver is able to assess whether or not the selected trajectory can be used for the later autonomous guidance of the motor vehicle. More specifically, the driver can arrive at a better decision as to which one of the two trajectories is to be preferred. The first trajectory can be recorded on the basis of a driver-controlled movement of the motor vehicle. Alternatively, the first trajectory can also be determined in some other manner, in particular algorithmically. In particular, the driver is able to determine whether it is safe to release one of the trajectories for the automatic control.

It is possible to determine a plurality of regions across which the first trajectory leads. At least one second trajectory, whose extension differs from the first trajectory in this region, can be determined for each region. Multiple alternatives to the second trajectory can be offered in this way. Prior to the autonomous control, for example, the driver can select a trajectory or a combination of trajectories in order to guide the vehicle from a starting point to a destination point of the first trajectory.

In a further variant, a decision by the driver for one of the trajectories leading across the region is detected prior to traveling each region. This allows the driver to operate region by region, and after traveling one region, the driver is able to make a decision regarding a trajectory to be used for travel of a subsequent region.

The autonomous control generally takes place at a very low velocity. In particular, the velocity can be slower than during traveling of the trajectory by the motor vehicle on the basis of a different method at a later point in time. Preferably, a predefined maximum velocity will not be exceeded during the autonomous control of the motor vehicle. This maximum speed can approximately amount to a walking speed, i.e., roughly 4 to 6 km/h. A slower maximum speed may also be specified.

During the autonomous control, the driver can transfer the motor vehicle into a safe state, preferably at any time. The safe state can include a standstill, in particular. The safe state can also be left again and the control of the motor vehicle be continued. The autonomous control can also be aborted during the drive or be aborted out of the safe state.

In addition, the motor vehicle can be brought into a safe state if it comes closer to an obstacle than a predefined distance. The obstacle can particularly be detected with the aid of a sensor on board the motor vehicle and involve an object or a person, for instance.

The motor vehicle is also capable of being transferred into the safe state if a driver-controlled operation of a control element fails to occur. Such a control element is also called a dead-man's button, a dead-man's pedal, or generally, a dead-man's device. The safe state of the motor vehicle can be automatically initiated immediately at the end of the operation of the control element or only after a predefined delay. This prevents the driver from losing control of the motor vehicle.

Moreover, the motor vehicle is capable of being brought into the safe state if the driver strays farther than a predefined distance from the motor vehicle. This makes it possible to force the driver to stay near the motor vehicle where the driver is best able to assess the automatic control and thus the driven trajectory.

A device for controlling a motor vehicle includes a memory device for storing a first trajectory; a processing device, which is developed to determine a region across which the first trajectory leads, and to determine a second trajectory that has a different extension in the determined region than the first trajectory; and an input device for detecting a driver-controlled selection of one of the trajectories. In addition, the processing device is developed to control the motor vehicle in such a way that it follows the selected trajectory.

In addition, the device can carry out still further functions on board the motor vehicle; for example, the device can realize a driver assistant for controlling the motor vehicle on the basis of the selected trajectory. The device is preferably developed to carry out at least a portion of the afore-described method. To do so, the device can include a programmable microcomputer or microcontroller.

Advantages or features of the present method can be related to the device, and vice versa. The present method can be available in the form of a computer-program product and can also be stored on a computer-readable memory device.

Furthermore, the device can include a wireless communications device for connecting the input device to the processing device. The processing device is preferably developed to transfer the motor vehicle into a safe state in the event that the communications connection is interrupted. For example, the interruption of the communications connection can be determined if a received field strength or a signal-to-noise ratio of a radio signal of the communications connection drops below a predefined value. It can optionally be checked whether the predefined value is undershot for longer than predefined. To cancel the safe mode, the driver can operate the input device appropriately.

In addition, the device preferably includes a graphical output device for displaying representations of the first and second trajectories. Usual display options such as shifting a displayed region or enlarging a cutaway are able to be supported.

The present invention will now be described in greater detail with reference to the appended figures.

DETAILED DESCRIPTION

Figure 1:
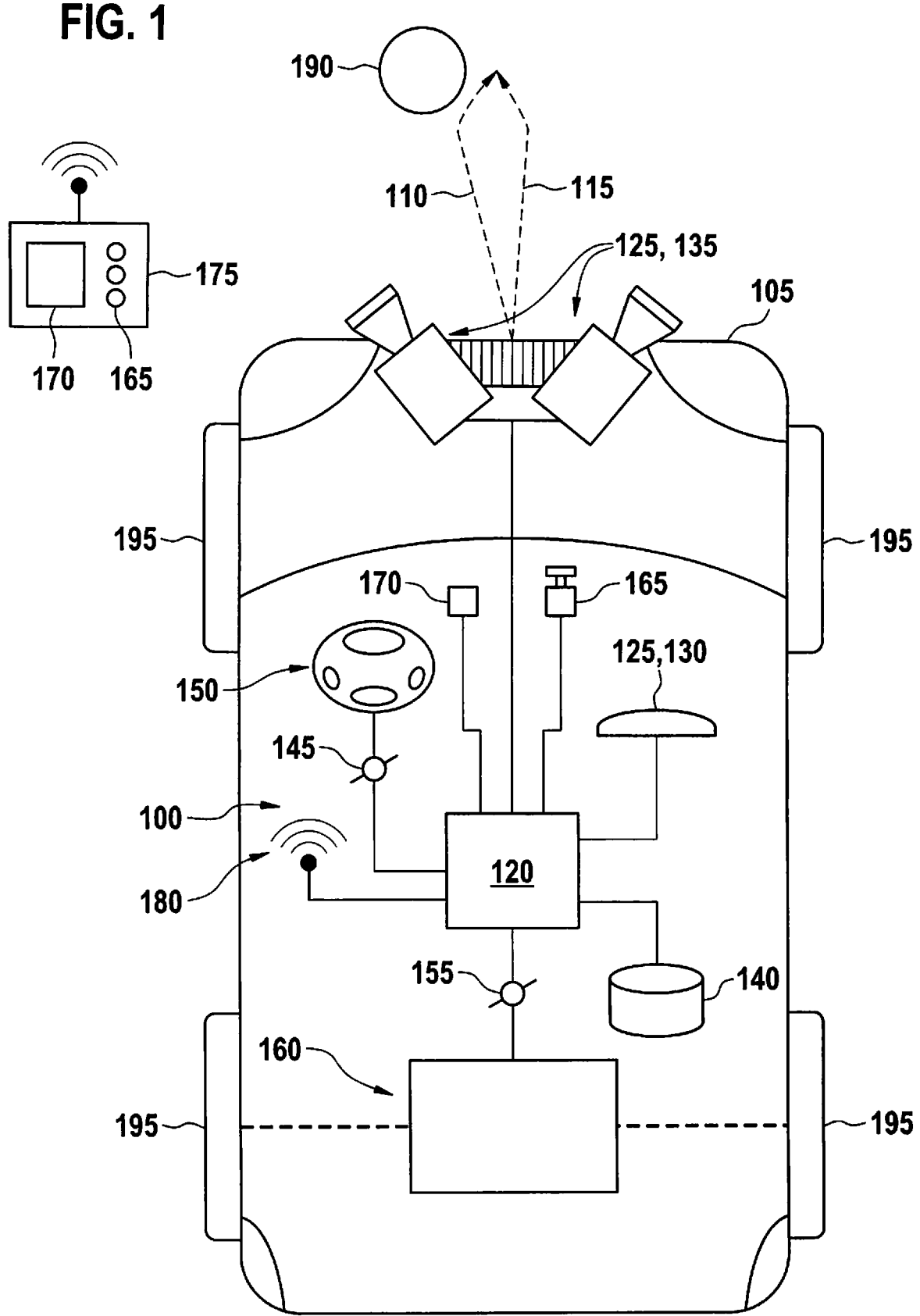
FIG. 1 illustrates a motor vehicle with a control device, according to an example embodiment of the present invention.

FIG. 1 shows a device 100 on board a motor vehicle 105. Motor vehicle 105 preferably encompasses a passenger car, but in other developments it can also include a commercial vehicle such as a truck, for instance. Device 100 is developed to guide motor vehicle 105 along a predefined first trajectory 110.

First trajectory 110 extends between a starting point and an end or destination point and usually takes care of a maneuvering task of the motor vehicle such as parking or unparking at a predefined parking position. As a rule, the starting and the end positions lie relatively close to each other, e.g., in a range of less than 5 m, approximately 5 to 10 m, or up to maximally 20 or 50 m. In other embodiments, the positions can also be at a distance of 100 m from each other or in a range of up to one or more kilometer(s). The starting and the end positions are usually geographically defined and thus statically specified. A second trajectory 115 uses a different route than first trajectory 110 from the starting position to the destination position.

Device 100 includes a processing device 120, at least one scanning device 125, which can include a positioning device 130 or an environment detection 135, and preferably also a memory device 140. In addition, a first interface 145 with respect to a lateral control 150 and/or a second interface 155 with respect to a longitudinal control 160 of motor vehicle 105 are provided. Moreover, a control element 165 or an optical, haptic, and/or acoustical output device 170 is/are preferably provided. In one further embodiment, control element 165 and/or output device 170 is/are encompassed by a mobile device 175, which can be in a communications connection to processing device 120 via a preferably wireless interface 180. One or more trajectory/trajectories 110, 115 can be represented on output device 170 in an effort to make it easier for a driver to arrive at a decision regarding a trajectory 110, 115 to be traveled. Output device 170 can include a graphical display, a touchscreen, or a head-up display for this purpose.

During an autonomous control of motor vehicle 105, the driver can be located outside motor vehicle 105, and preferably carry mobile device 175 with the driver in order to control motor vehicle 105. This makes it possible for the driver, in particular when traveling a difficult stretch in which especially accurate maneuvering is the goal, to better monitor the situation from a selectable perspective. The driver is preferably capable of stopping motor vehicle 105 at any time or capable of transferring it into a safe state. In an example embodiment, the driver is also able to return motor vehicle 105 to a portion of traveled trajectory 110, 115 in order to travel trajectory 110, 115 anew at this particular location. It is also possible that the driver returns motor vehicle 105 to the start of a predefined region and then opts for another trajectory 110, 115 for traveling the region.

Positioning device 130 can particularly include a navigation receiver of a satellite-based navigation system, for example, or an inertial sensor system that provides the highest accuracy possible. Additional sensors can be used to increase the positioning accuracy. Environment detection 135, for example, can be an optical camera, an infrared camera, a radar, lidar sensor, or an ultrasonic system. Using an environment detection 135, a movement of motor vehicle 105 can be inferred on the one hand, and an object 190 in the environment of motor vehicle 105 can be determined on the other hand. Information pertaining to further objects 190, for instance, is able to be stored in a map memory of a navigation system which could include a positioning device 130.

A steering device of motor vehicle 105 usually constitutes lateral control 150. Via first interface 145, lateral control 150 is able to be operated in order to control the driving direction of motor vehicle 105. Longitudinal control 160 normally includes a drive motor, which is able to be realized as an electric motor, an internal combustion engine, or a combination of both, in particular. In addition, longitudinal control 160 can encompass a service brake or a parking brake. Longitudinal control 160 is able to act on any wheels 195 of motor vehicle 105. It is generally preferred that motor vehicle 105 is a two-track vehicle and that wheels 195 are situated on axles in pairs. Via second interface 155, longitudinal control 160 is able to be controlled by processing device 120 for the control of the longitudinal movement of motor vehicle 105 in terms of direction and speed.

It is possible that still further or alternative sensors are provided on board of motor vehicle 105. Angle-of-rotation sensors or rpm-sensors, for instance, can be mounted on wheels 195, or a position of motor vehicle 105 is able to be determined on the basis of an external device that could include an optical tracking system of motor vehicle 105, in particular.

It is proposed to develop device 100 for determining a second trajectory 115, as an alternative to first trajectory 110, to leave the selection between trajectories 110, 115 up to a driver, and to then travel selected trajectory 110, 115 using motor vehicle 105. The driver is then able to decide whether selected trajectory 110, 115 is sufficiently safe for later use for the autonomous control of motor vehicle 105 without monitoring by the driver.

Figure 2:
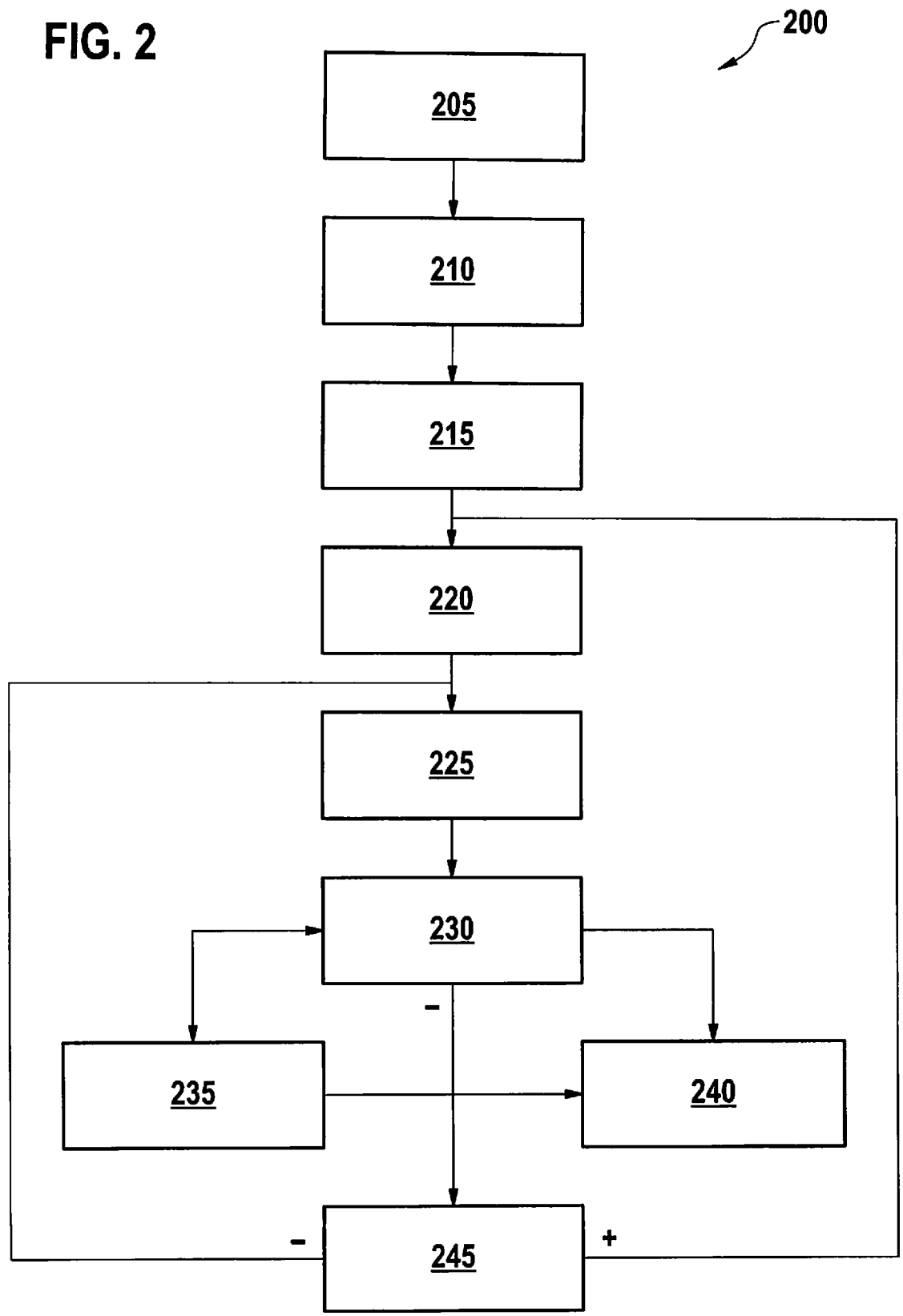
FIG. 2 is a flowchart that illustrates a method for controlling a motor vehicle, according to an example embodiment of the present invention.

FIG. 2 shows a flowchart of a method 200 for controlling a motor vehicle 105. In a first step 205, motor vehicle 105 is located at a starting position from where first trajectory 110 extends. For instance, method 200 can be initiated in that a driver manually starts the traveling of first trajectory 110, or in that processing unit 120 makes a corresponding suggestion, which a driver of motor vehicle 105 accepts.

First trajectory 110 can be stored in memory device 140. It can have been determined by recording a driver-controlled movement of motor vehicle 105, for example, or especially through an algorithmic determination, e.g., using processing device 120. In an example embodiment, a previously traveled first trajectory 110 can also be reversed in order to offer autonomous traveling of first trajectory 110 in a direction that is the reverse of the travel direction just used.

In a step 210, one or more region(s) across which first trajectory 110 leads is/are determined. In a step 215, a second trajectory 115 that differs from first trajectory 110 in at least one region is determined. Second trajectory 115 can also differ from first trajectory 110 in multiple regions. It is also possible to determine multiple second trajectories 115, which differ from the route of first trajectory 110 in one or more region(s) in each case.

In a step 220, a second determined trajectory or multiple determined second trajectories 115 and possibly also first trajectory 110 can be offered to the driver for the decision. To do so, a graphical representation, in particular, can take place on output device 170.

If the driver decision was detected, then motor vehicle 105 can be controlled in an autonomous manner along selected trajectory 110, 115 in a step 225. The control usually includes determining the position of motor vehicle 105 with the aid of positioning device 130; comparing the determined position to selected trajectory 110, 115; and possibly transmitting control signals via first interface 145 and/or second interface 155.

During the autonomous guidance of motor vehicle 105, in a step 230, it is preferably determined whether an error state is present. The error state can be manually initiated by the driver, for instance in that the driver operates a control element 165. As an alternative, the error state is also able to be initiated if the driver fails to operate a provided control element 165 for longer than a predefined time. Furthermore, the error state can be initiated if it is determined on the basis of a scanning device 125 that a distance between motor vehicle 105 and an object 190 is less than a predefined threshold value. In one still further embodiment, the driver of motor vehicle 105 can leave motor vehicle 105 with a control device that is in a communications connection to motor vehicle 105 via wireless interface 180. If no adequate information transmission is possible with the aid of wireless interface 180, then the safe state can also be initiated. For instance, this can be the case where there is an interruption of communication, or an increased distance, between mobile device 175 and motor vehicle 105. In an example embodiment, the distance between motor vehicle 105 and mobile device 175 is determined, e.g., with the aid of a further positioning device 130 mounted on mobile device 175. Toward this end, mobile device 175 can be developed as a mobile telephone device having supplementary functions (smartphone).

In a step 235, motor vehicle 105 assumes the safe state. The safe state usually requires a complete standstill of motor vehicle 105. A service or parking brake can be activated in the process. A drive motor, which is included by longitudinal control 160, can be transferred into an idling state or be switched off.

It is possible to return from a safe state in step 235 to step 230 or to step 225, e.g., if the driver gives an appropriate command, in particular using control element 165. Also possible is a forced transition from one of steps 225, 230, or 235 to a step 240, in which method 200 is aborted. For example, should an autonomous control no longer be possible because the space for maneuvering between objects 190 around vehicle 105 is no longer sufficient, then step 240 can be initiated.

If it is determined in step 230 that no error is present, then the control can be continued in step 225. Prior to doing so, it is preferably checked in a step 245 whether motor vehicle 105 has crossed one region and has reached a next region. This applies if a plurality of regions is defined between the starting point and the destination point. In the event that the next region has been reached, method 200 is able to return to step 220 in which a driver scans a selection of a trajectory 110, 115 across the upcoming region. In an example embodiment, a second trajectory 115 for the upcoming region that deviates from first trajectory 110 can also be determined only at this particular point in time.

The decision as to which trajectory 110, 115 is to be used can be determined individually for each region or jointly for multiple or for all regions prior to driving.

Figure 3:
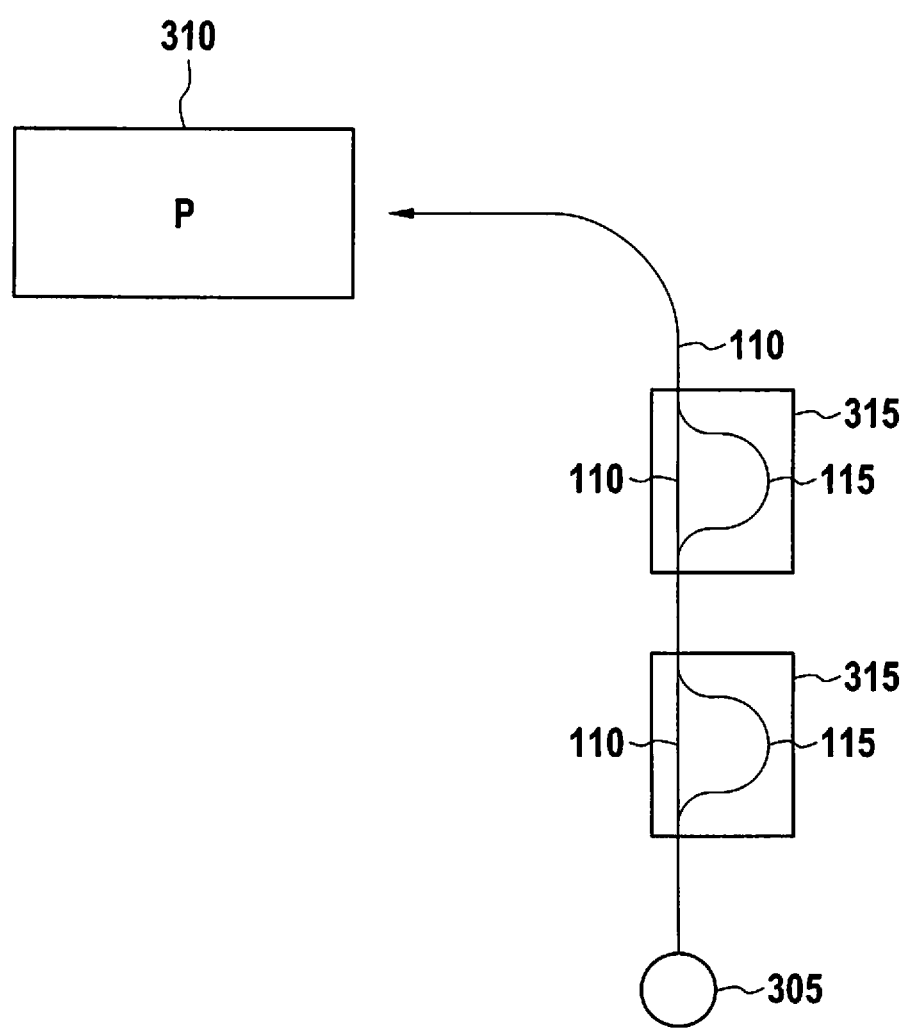
FIG. 3 illustrates example alternative trajectories for guiding a motor vehicle, according to an example embodiment of the present invention.

FIG. 3 exemplarily shows alternative trajectories 110, 115 for guiding a motor vehicle 105. First trajectory 110 extends between a starting point 305 and a destination point 310. Destination point 310 can include a garage, a parking bay, or a parking space, for instance. One or multiple region(s) 315 lie(s) on first trajectory 110. A second trajectory 115 differs from first trajectory 110 in at least one of regions 315. For example, second trajectory 115 can include an alternative path around an obstacle (passing on the right instead of the left) or a section that is laterally offset from first trajectory 110. Trajectories 110, 115 usually share at least one further section.

In the illustrated embodiment, second trajectory 115 differs from first trajectory 110 in both regions 315. However, it is also possible to determine multiple second trajectories 115 of which one differs from first trajectory 110 only in first region 315, another differs only in second region 315, and a third differs in both regions 315. Corresponding permutations can be found for more or fewer regions 315. Any number of second trajectories 115 can be determined.

A driver is able to select one of trajectories 110, 115 on which motor vehicle 105 will then be slowly guided in order to allow for an assessment by the driver as to whether or not traveled trajectory 110, 115 is trustworthy for subsequent autonomous driving, for instance. In an embodiment, a multitude of second trajectories 115 is determined between starting point 305 and destination point 310, and the driver makes a decision, even prior to passing through the one region 315, as to which trajectory 110, 115 is to be followed, so that the selected trajectory from starting point 305 across all regions 315 up to destination point 310 is known. In another embodiment, the driver is able to select a particular trajectory 110, 115 whose routes differ in upcoming region 315, and to do so prior to traveling each region 315. Mixed forms, especially for a decision for a trajectory 110, 115 that is specified in multiple but not all regions 315 are also possible.

What is claimed is:

1. A method for autonomously controlling a motor vehicle in a parking or unparking operation, the method comprising:
storing, via a memory, a first trajectory;
determining, via a processor, at least one region across each of which the first trajectory leads;

determining, via the processor, at least one second trajectory that has a different extension than the first trajectory in the at least one determined region;
displaying, via an output device, the first trajectory and the at least one second trajectory;
detecting, via an input device, a driver-controlled selection of one of the trajectories displayed via the output device;
autonomously controlling, via the processor, the motor vehicle to follow the selected trajectory;
determining, during an autonomous guidance of the motor vehicle, whether an error state is present, wherein the error state is caused by the driver failing to operate the control element for longer than a predefined time; and wherein the error state is caused by a distance between the motor vehicle and an object being less than a threshold value; and
placing, if there is the error state, the motor vehicle in a safe state requiring a standstill of the motor vehicle;
wherein the autonomous controlling of the vehicle takes place at a velocity of the parking and/or unparking operation, and
wherein the safe state requires a standstill of motor vehicle in which a service brake or a parking brake is activated to bring the motor vehicle to the standstill.

2. The method of claim 1, wherein the at least one region includes a plurality of regions, and the at least one second trajectory includes a plurality of second trajectories that are each determined for, and has different extension than the first trajectory in, a respective one of the plurality of regions.

3. The method of claim 2, wherein, for each of the plurality of regions, prior to traveling the respective region, a selection by the driver between the first trajectory and the respective second trajectory determined for the respective region is detected.

4. The method of claim 1, wherein a predefined maximum speed is not exceeded during the controlling.

5. The method of claim 1, further comprising:
controlling the motor vehicle to enter the safe state responsive to detection of the motor vehicle coming closer to the obstacle than a predefined distance during the controlling of the motor vehicle to follow the selected trajectory.

6. The method of claim 1, further comprising:
controlling the motor vehicle to enter the safe state responsive to failure of a driver-controlled operation of a control element to occur during the controlling of the motor vehicle to follow the selected trajectory.

7. The method of claim 1, further comprising:
controlling the motor vehicle to enter the safe state responsive to the driver straying from the motor vehicle farther than a predefined distance during the controlling of the motor vehicle to follow the selected trajectory.

8. A device for autonomously controlling a motor vehicle in a parking or unparking operation, comprising:
a memory to store a first trajectory;
a processor to determine a region across which the first trajectory leads; and determine a second trajectory that has a different extension than the first trajectory in the determined region;
an output device to display the first trajectory and the at least one second trajectory; and
an input device to detect a driver-controlled selection of one of the trajectories displayed on the output device;
controlling, via the processor, in an autonomous manner, the motor vehicle to follow the selected trajectory;
determining, during an autonomous guidance of the motor vehicle, whether an error state is present, wherein the error state is caused by the driver failing to operate the control element for longer than a predefined time; and wherein the error state is caused by a distance between the motor vehicle and an object being less than a threshold value; and
placing, if the error state is determined, the motor vehicle in a safe state requiring a standstill of the motor vehicle;
wherein the autonomous controlling of the vehicle takes place at a velocity of the parking and/or unparking operation, and
wherein the safe state requires a standstill of motor vehicle in which a service brake or a parking brake is activated to bring the motor vehicle to the standstill.

9. The device of claim 8, further comprising:
a wireless communications device configured to connect the input device to the processor, wherein the processor is configured to transfer the motor vehicle into the safe state if the communications connection is interrupted.

10. The device of claim 9, further comprising:
a graphical output device configured to display representations of the first and second trajectories.

* * * * *